(12) United States Patent
Shin et al.

(10) Patent No.: US 9,241,387 B2
(45) Date of Patent: Jan. 19, 2016

(54) ORGANIC LIGHT EMITTING DISPLAY DEVICE AND METHOD OF DRIVING THE SAME

(71) Applicant: Samsung Display Co., Ltd., Yongin-City, Gyeonngi-Do (KR)

(72) Inventors: Jeong-Hwan Shin, Yongin (KR); Wook Lee, Yongin (KR); Se-Byung Chae, Yongin (KR)

(73) Assignee: Samsung Display Co., Ltd., Samsung-ro, Giheung-Gu, Yongin-si, Gyeonggi-Do (KR)

(*) Notice: Subject to any disclaimer, the term of this patent is extended or adjusted under 35 U.S.C. 154(b) by 85 days.

(21) Appl. No.: 14/032,684

(22) Filed: Sep. 20, 2013

(65) Prior Publication Data

US 2014/0191663 A1    Jul. 10, 2014

(30) Foreign Application Priority Data

Jan. 8, 2013  (KR) ........................ 10-2013-0002049

(51) Int. Cl.
*G09G 5/00*  (2006.01)
*H05B 33/08* (2006.01)

(52) U.S. Cl.
CPC .................................. *H05B 33/0896* (2013.01)

(58) Field of Classification Search
CPC ......................................................... G09G 5/00
USPC ......................................................... 315/151
See application file for complete search history.

(56) References Cited

U.S. PATENT DOCUMENTS

| | | | |
|---|---|---|---|
| 8,451,208 B2* | 5/2013 | Lee et al. ........................ | 345/99 |
| 8,937,585 B2* | 1/2015 | Jang ................................ | 345/82 |
| 9,007,355 B2* | 4/2015 | Gang .................. | H01L 27/3276 345/100 |
| 9,041,626 B2* | 5/2015 | Park ......................... | G09G 3/20 345/211 |
| 2007/0046587 A1 | 3/2007 | Takahara | |
| 2011/0205202 A1 | 8/2011 | Son et al. | |

FOREIGN PATENT DOCUMENTS

| | | |
|---|---|---|
| KR | 10-2007-0026711 | 3/2007 |
| KR | 10-2011-0097049 | 8/2011 |

* cited by examiner

*Primary Examiner* — Hai L Nguyen
(74) *Attorney, Agent, or Firm* — Robert E. Bushnell, Esq.

(57) ABSTRACT

There is provided an organic light emitting display device capable of reducing power consumption by adjusting a voltage according to an input image and deterioration of the organic light emitting display device and a method of driving the same.

12 Claims, 4 Drawing Sheets

ORGANIC LIGHT EMITTING DISPLAY DEVICE AND METHOD OF DRIVING THE SAME

CLAIM OF PRIORITY

This application makes reference to, incorporates the same herein, and claims all benefits accruing under 35 U.S.C. §119 from an application earlier filed in the Korean Intellectual Property Office on 8 Jan. 2013 and there duly assigned Serial No. 10-2013-0002049.

BACKGROUND OF THE INVENTION

1. Field of the Invention

An embodiment of the present invention relates to an organic light emitting display device and a method of driving the same, and more particularly, to an organic light emitting display device capable of reducing power consumption by adjusting a voltage according to an input image and deterioration of the organic light emitting display device and a method of driving the same.

2. Description of the Related Art

Recently, various flat panel display devices (FPD) capable of reducing weight and volume that are disadvantages of cathode ray tubes (CRT) have been developed. The FPDs include liquid crystal display devices (LCD), field emission display devices (FED), plasma display panels (PDP), and organic light emitting display devices.

Among the FPDs, the organic light emitting display devices display images using organic light emitting diodes (OLED) that generate light by re-combination of electrons and holes. The organic light emitting display device has higher response speed and is driven with lower power consumption.

The contemporary organic light emitting display device includes a data driving unit for supplying data signals to data lines, a scan driving unit for sequentially supplying scan signals to scan lines, a pixel unit having pixels arranged at every intersections between the scan lines, and a timing controller for controlling operations of the data driving unit and the scan driving unit.

The pixels charge, when the scan signal are supplied, voltage corresponding to the data signals supplied through the data lines storage capacitors included in the respective pixels and supply current corresponding to the charged voltage to organic light emitting diodes to emit light of luminance corresponding to the data signals.

In the contemporary organic light emitting display device, an optimized level of the base power voltage of a shipped product is a first voltage but a second voltage is set to the level of the base power voltage by considering deterioration of the organic light emitting display device. Thus, additional power consumption occurs as much as a difference between the first voltage and the second voltage even before the organic light emitting display device is deteriorated. The contemporary organic light emitting display device supplies a third voltage as a level of the base power voltage by considering the full white pattern regardless of supplying the fourth voltage or the fifth voltage as a level of the base power voltage in a normal case. By doing so, there occurs an additional power consumption corresponding to a difference between the third voltage and the fourth voltage or the fifth voltage.

The above information disclosed in this Background section is only for enhancement of understanding of the background of the described technology and therefore it may contain information that does not form the prior art that is already known in this country to a person of ordinary skill in the art.

SUMMARY OF THE INVENTION

Accordingly, the present invention has been made to provide an organic light emitting display device capable of reducing power consumption by regulating a power voltage based on an input image and deterioration of an the organic light emitting display device, and a method of driving the same.

In order to achieve the foregoing and/or other aspects of the present invention, there is provided an organic light emitting display device including: a pixel unit including pixels arranged at every intersection between data lines and scan lines; a data driving unit supplying data signals to the data lines; a scan driving unit supplying scan signals to the scan lines sequentially; an image analyzer analyzing an input image and outputting a maximum luminance level of the input image according to the analyzed result; a power voltage controller reading a voltage level corresponding to the maximum luminance level from a lookup table and outputting a power voltage control signal corresponding to the read voltage level; a power supply supplying a power voltage corresponding to the voltage level to the pixel unit via power lines in response to the power voltage control signal; and a corrector correcting the voltage level corresponding to the maximum luminance level stored in the lookup table based on a difference between a current flowing through the power lines and a current estimated in corresponding to the voltage level.

According to an embodiment of the present invention, the image analyzer may include a luminance histogram generator generating a luminance histogram for the input image, and a maximum luminance level extractor extracting the maximum luminance level from the luminance histogram.

According to an embodiment of the present invention, the image analyzer may further include a power voltage variation estimator estimating a power voltage variation of the power voltage based on the luminance histogram and outputting the estimated power voltage variation to the power voltage controller.

According to an embodiment of the present invention, the power voltage controller may regulate and output the power voltage control signal in response to the estimated power voltage variation.

According to an embodiment of the present invention, the corrector may do not work when temperature of the organic light emitting display device and the input image are changed.

According to an embodiment of the present invention, the power voltage may be a driving power voltage or a base power voltage.

Another aspect of the present invention provides a method of driving an organic light emitting display device including: generating a luminance histogram for an input image; extracting a maximum luminance level from the luminance histogram; reading a voltage level corresponding to the maximum luminance level from a lookup table; supplying a power voltage corresponding to the read voltage level to a pixel unit through power lines; and correcting the voltage level corresponding to the maximum luminance level stored in the lookup table according to a difference between a current flowing through the power lines and an estimated current corresponding to the voltage level.

According to an embodiment of the present invention, the method may further include estimating a power voltage variation of the power voltage based on the luminance histogram.

According to an embodiment of the present invention, in the supply of the power voltage corresponding to the read voltage level to the pixel unit though the power lines, the voltage level may be regulated in response to the power voltage variation and the power voltage corresponding to the regulated voltage level may be supplied to the pixel unit.

According to an embodiment of the present invention, correcting the voltage level may include: determining whether temperature of the organic light emitting display device and the input image are changed; and correcting the voltage level corresponding to the maximum luminance level stored in the lookup table based on a difference between a current flowing through the power lines and an estimated current corresponding to the voltage level when the temperature and the input image are not changed as the determined result.

According to an embodiment of the present invention, correcting the voltage level may further include: sensing a current flowing through the power lines; comparing an estimated current corresponding to the voltage level with the sensed current; and correcting the voltage level corresponding to the maximum luminance level stored in the lookup table when the estimated current corresponding to the voltage level is different from the sensed current according to the compared result.

According to an embodiment of the present invention, the power voltage may be a driving power voltage or a base power voltage.

According to the organic light emitting display device according to the present invention and the method of driving the same, the power voltage is regulated based on the input image and deterioration of the organic light emitting display device so that power consumption may be reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
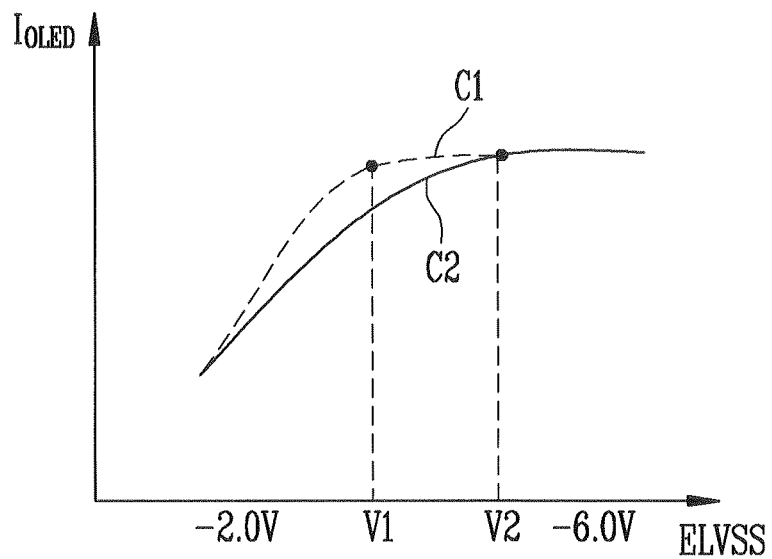
FIG. 1 is a graph illustrating a contemporary method of determining a level of a power voltage considering deterioration of a contemporary organic light emitting display device.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a graph illustrating a method of determining a level of a power voltage by considering deterioration of a contemporary organic light emitting display device.

In reference to FIG. 1, a first curve C1 indicates relationships between a power voltage of a shipped product, for example, a base power voltage ELVSS and a current $I_{OLED}$ flowing through an organic light emitting diode, while a second curve C2 indicates relationships between the base power voltage ELVSS and the current $I_{OLED}$ when the organic light emitting display device deteriorates.

In the contemporary organic light emitting display device, an optimized level of the base power voltage of a shipped product is a first voltage V1 but a second voltage V2 is set to the level of the base power voltage by considering deterioration of the organic light emitting display device. Thus, additional power consumption occurs as much as a difference between the first voltage V1 and the second voltage V2 even before the organic light emitting display device is deteriorated.

Figure 2:
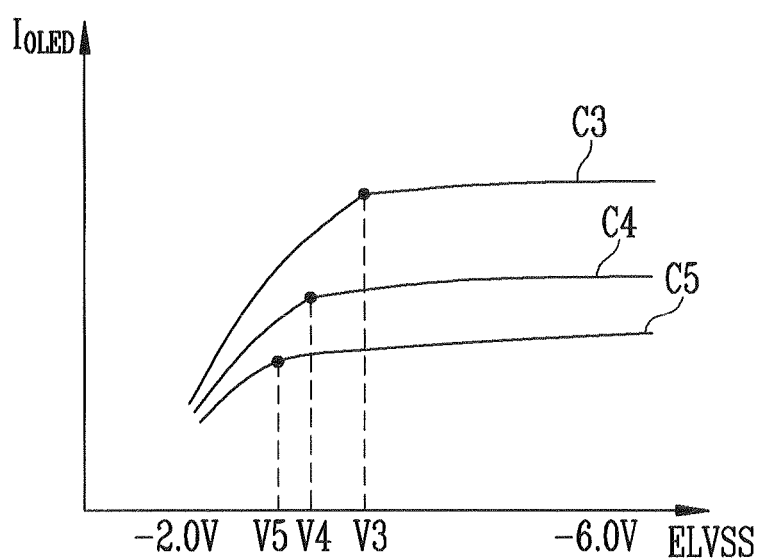
FIG. 2 is a graph illustrating a contemporary method of determining a level of a power consumption considering full white pattern of a contemporary organic light emitting display device.

FIG. 2 is a graph illustrating a method of determining a power voltage considering a full white pattern in a contemporary organic light emitting display device.

In reference to FIG. 2, a third curve C3 indicates relationships between a base power voltage ELVSS and a current $I_{OLED}$ when an organic light emitting diode emits light in the full white pattern, that is, at the brightest luminance, while a fourth curve C4 and a fifth curve C5 indicate relationships between the base power voltage ELVSS and the current $I_{OLED}$ when the organic light emitting diode emits at a normal luminance.

The contemporary organic light emitting display device supplies a third voltage V3 as a level of the base power voltage ELVSS by considering the full white pattern regardless of supplying the fourth voltage V4 or the fifth voltage V5 as a level of the base power voltage ELVSS in a normal case. By doing so, there occurs an additional power consumption corresponding to a difference between the third voltage V3 and the fourth voltage V4 or the fifth voltage V5.

Hereinafter, an organic light emitting display device according to an embodiment of the present invention and a method of driving the same will be described in detail as follows with reference to the accompanying drawings.

Figure 3:
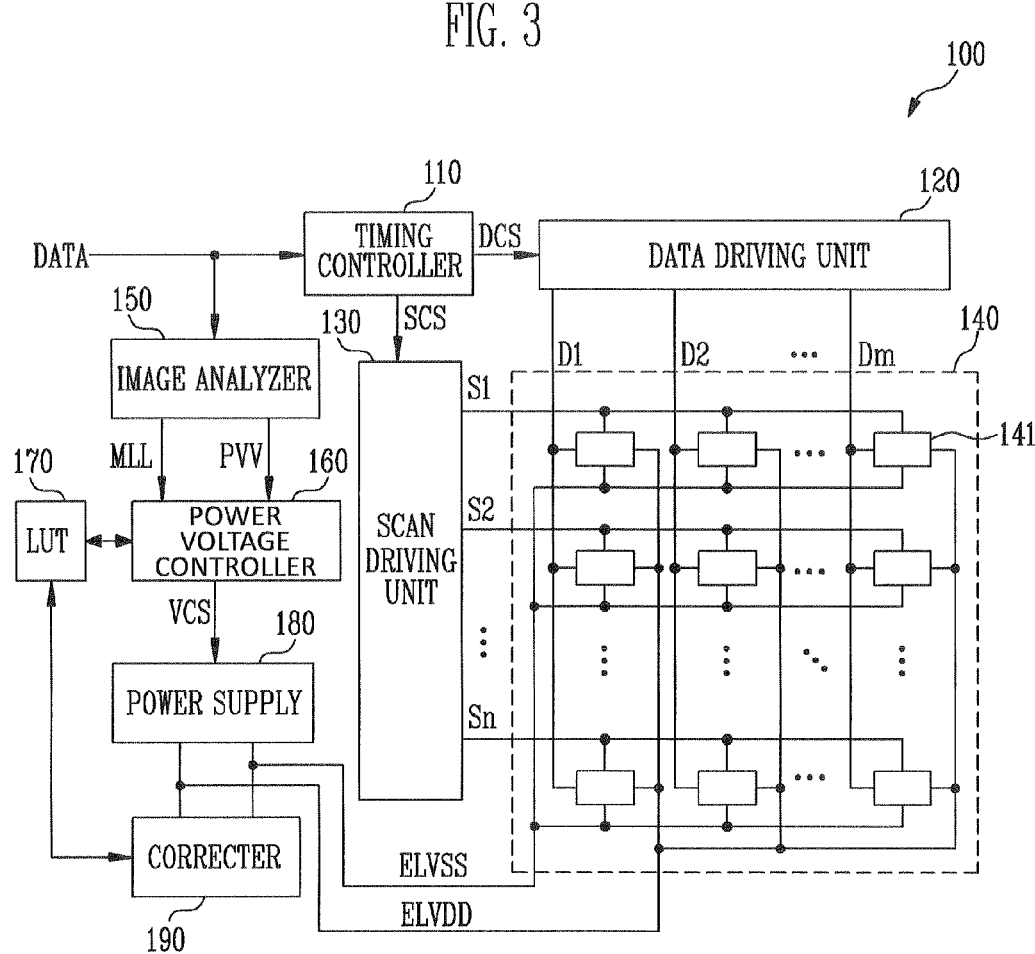
FIG. 3 is a view illustrating an organic light emitting display device according to an embodiment of the present invention.
Figure 4:
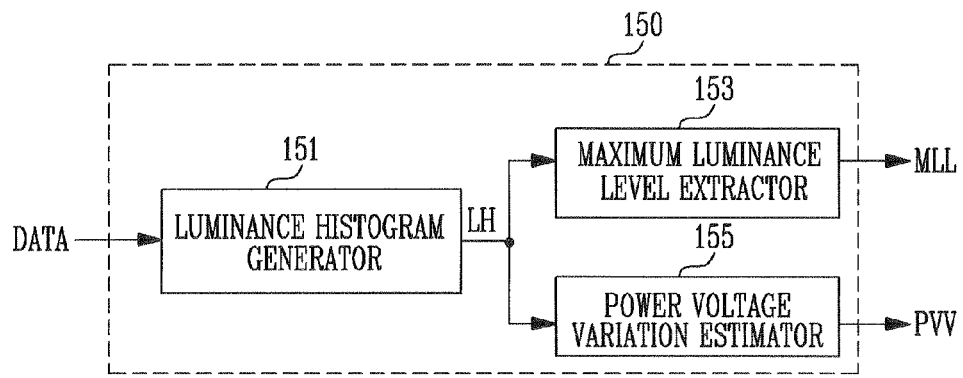
FIG. 4 is a view illustrating an image analyzer in FIG. 3.

FIG. 3 is a view illustrating an organic light emitting display device according to an embodiment of the present invention and FIG. 4 is a view illustrating an image analyzer in FIG. 3.

In reference to FIG. 3, an organic light emitting display device 100 includes a timing controller 110, a data driving unit 120, a scan driving unit 130, a pixel unit 140, an image analyzer 150, a power voltage controller 160, a lookup table 170, a power supply 180, and a corrector 190.

The timing controller 110 controls operations of the data driving unit 120 and the scan driving unit 130 and arranges data supplied from the outside again to output the re-arranged data to the data driving unit 120.

Specifically, the timing controller 110 creates a data driving control signal DCS and supply the created data driving control signal DCS to the data driving unit 120, and creates a scan driving control signal SCS and supplies the created scan driving control signal SCS to the scan driving unit 130, in response to a synchronization signal supplied from the outside.

The data driving unit 120, under the control of the timing controller 110, that is, in response to the data driving control signal DCS outputted from the timing controller 110, supplies data signals to the pixel unit 140 through the data lines D1 to Dm.

The scan driving unit 130, under the control of the timing controller 110, that is, in response to the scan driving signal SCS outputted from the timing controller 110, supplies the scan signals to scan lines S1 to Sn sequentially.

The pixel unit 140 includes the pixels 141 arranged at every intersection of the data lines D1 to Dm and the scan lines S1 to Sn. Each of the pixels 141, in response to the scan signals outputted through the scan lines S1 to Sn, charges the storage capacitors included in the respective pixels 141 with a voltage corresponding to the data signals outputted through the data lines D1 to Dm. The respective pixels 141 generate light of luminance corresponding to the data signals by making current flow corresponding to the charged voltage of the storage capacitor from a first voltage ELVDD to a second voltage ELVSS via an organic light emitting diode.

The image analyzer 150 receives input image data DATA from the outside to analyze the input unit and a maximum luminance level MLL of the input image to the power voltage controller 160 according to the analyzed results. For example, the image analyzer 150 may create a luminance histogram LH of the input image based on the input image data DATA and may extract a maximum luminance level MLL of the input image from the create luminance histogram LH. Here, the maximum luminance level MLL refers to a luminance level of a pixel emitting light of the brightest luminance among the input image of one frame.

Moreover, the image analyzer 150 estimates power voltage variation of the power voltage ELVDD or ELVSS according to the analyzed results and outputs the estimated power voltage variation PVV to the power voltage controller 160. Specifically, the image analyzer 150 analyzes luminance level distribution of the remaining pixels excluding a pixel with the maximum luminance level MLL to estimate the power voltage variation PVV of the power voltage ELVDD or ELVSS. PVV refers to estimated value of the voltage drop of the power voltage ELVDD or ELVSS according to the rest of pixels excluding the pixel with maximum luminance level MLL.

For example, when there is one pixel with a luminance level of 15, four pixels with a luminance level of 14, and five pixels with a luminance level of 10 in the input image, the image analyzer 150 outputs the luminance level of 15 as the maximum luminance level MLL and estimates and outputs a power voltage variation PPV corresponding to the four pixels with the luminance level of 14 and the five pixels with the luminance level of 10.

In reference to FIG. 4, the image analyzer 150 includes a luminance histogram generator 151, a maximum luminance level extractor 153, and a power voltage variation estimator 155.

The luminance histogram generator 151 generates a luminance histogram LH for an input image based on the input image data DATA. Specifically, the luminance histogram generator 151, based on the input image data DATA, counts the number of the pixels every luminance level from an input image of one frame to generate the luminance histogram LH.

The maximum luminance level extractor 153 extracts the maximum luminance level MLL from the luminance histogram LH outputted from the luminance histogram generator 151 and outputs the extracted maximum luminance level MLL to the power voltage controller 160.

The power voltage variation estimator 155, based on the luminance histogram LH, estimates the power voltage variation PVV of the power voltage ELVDD or ELVSS of the remaining pixels excluding the pixels with the maximum luminance level MLL according to the luminance level distribution and outputs the estimated power voltage variation PVV to the power voltage controller 160.

The power voltage controller 160 reads a voltage level corresponding to the maximum luminance level MLL outputted from the image analyzer 150 from a lookup table 170 and outputs a power voltage control signal VCS corresponding to the read voltage level to the power supply 180.

According to an embodiment, the power voltage controller 160 regulates the voltage level read from the lookup table 170 corresponding to the power voltage variation PVV outputted from the image analyzer 150 and outputs a power voltage control signal VCS corresponding to the regulated voltage level to the power supply 180.

For example, when the level of the base power voltage corresponding to the maximum luminance level MLL is −3.0 V and the power voltage variation PVV indicates −1.0 V, the power voltage controller 160 may output a power voltage control signal VCS corresponding to the voltage level of −4.0 V to the power supply 180.

The lookup table 170 stores voltage levels corresponding to the luminance levels of the shipped product respectively. The data stored in the lookup table 170 may be corrected under the control of the corrector 190.

The power supply 180, in response to the power voltage control signal VCS outputted from the power voltage controller 160, outputs the power voltage ELVDD or ELVSS of the voltage level corresponding to the maximum luminance level MLL to the pixel unit 140 via power lines.

The corrector 190 senses current flowing through the power lines and corrects the data stored in the lookup table 170 based on the sensed current. Specifically, the corrector 190, when the current estimated in response to the level of the power voltage ELVDD or ELVSS supplied through the power lines is not equal to the current actually flows through the power lines, corrects the data stored in the lookup table 170 according to the difference.

The corrector 190 may work only when temperature and an image of the organic light emitting display device 100 are not changed. To this end, the organic light emitting display device 100 may further include a temperature sensor (not shown).

When temperature or the input image of the organic light emitting display device 100 are changed, the voltage level of the power voltage ELVDD or ELVSS and/or the current flowing through the power lines may vary. Thus, the corrector 190 may work only when the temperature or the input image of the organic light emitting display device 100 is not changed so as to prevent malfunctions.

Figure 5:
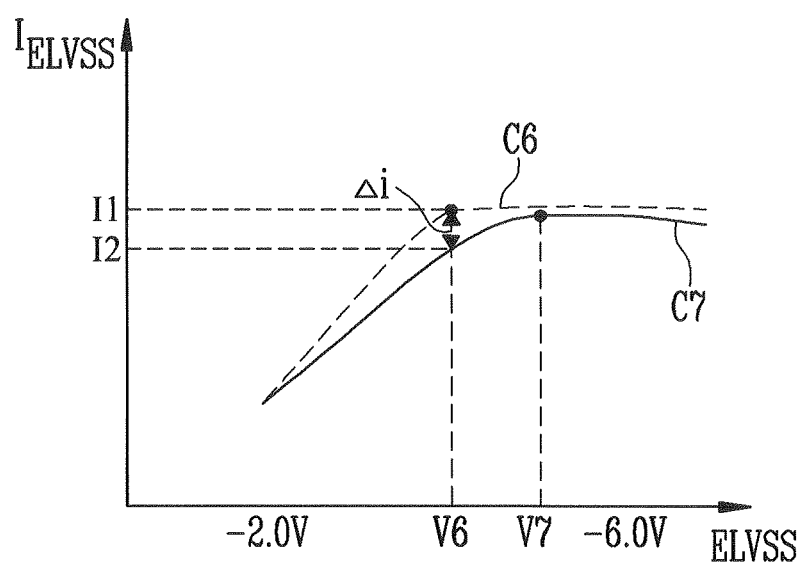
FIG. 5 is a graph illustrating a method of correcting a voltage level corresponding to a level of maximum luminance by a corrector in FIG. 3.

FIG. 5 is a graph illustrating a method of correcting a voltage level corresponding to the maximum luminance level by the corrector in FIG. 3.

In reference to FIG. 5, a sixth curve C6 indicates relationships between a power voltage of a shipped product, for example, the base power voltage ELVSS and a current $I_{ELVSS}$ flowing the power lines, for example, base power lines, while a seventh curve C7 indicates relationships between the base power voltage ELVSS and the current $I_{ELVSS}$ when the organic light emitting display device deteriorates.

The power supply 180 supplies a sixth voltage V6 as a voltage level of the base power voltage ELVSS to the base power lines under the control of the power voltage controller 160. In this case, a value of the current estimated to flow through the base power lines in corresponding to the sixth voltage V6 is a first current I1. However, due to the deterioration of the organic light emitting display device 100, a value of the current actually flows through the base power lines is a second current I2.

In this case, the corrector 190 correct the data stored in the lookup table 170 into a seventh voltage V7 based on a difference Δi (I1-I2) between the first current I1 and the second current I2. After that, the power supply 180 supplies the seventh voltage V7 as the base power voltage ELVSS.

FIG. 5 shows the method of correcting a voltage level of the base power voltage ELVSS stored in the lookup table 170 by the corrector 190, but the spirit of the present invention is not limited thereto. That is, the corrector 190, similar to the method illustrated in FIG. 5, may correct the voltage level of the driving power voltage ELVDD stored in the lookup table 170.

The organic light emitting display device 100 according to an embodiment of the present invention can regulate a level of the power voltage ELVDD or ELVSS according to deterioration of the organic light emitting display device 100 so that the level of the power voltage ELVDD or ELVSS can be set regardless of taking deterioration of the shipped organic light emitting display device 100 into consideration. Therefore, the power consumption may be reduced before the organic light emitting display device is shipped and deteriorated.

Figure 6:
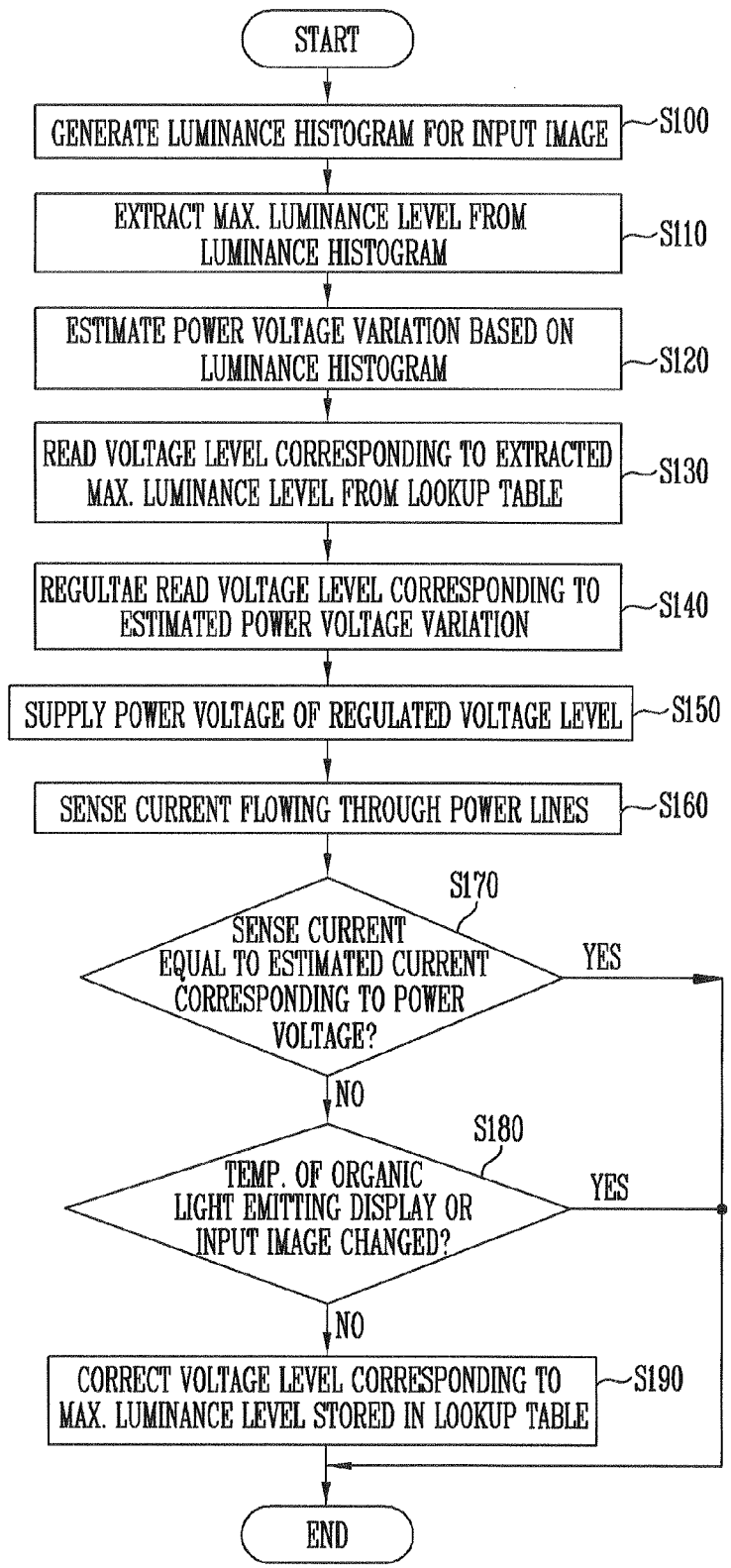
FIG. 6 is a flowchart illustrating a driving method of the organic light emitting display device according to an embodiment of the present invention.

FIG. 6 is a flowchart illustrating a driving method of the organic light emitting display device according to an embodiment of the present invention.

In reference to FIG. 6, the luminance histogram generator 151 generates a luminance histogram LH for the input image based on the input image data DATA (S100). The maximum luminance level extractor 153 extracts the maximum luminance level MLL from the luminance histogram LH and the voltage variation estimator 155 estimates the power voltage variation PVV based on the luminance histogram LH. (S110 and S120)

The power voltage controller 160 outputs the voltage control signal VCS to the power supply 180, in response to the maximum luminance level MLL and the power voltage variation PVV. That is, the power voltage controller 160 reads a voltage level corresponding to the maximum luminance level MLL from the lookup table 170 (S130), regulates the read voltage level in response to the power voltage variation PVV, and outputs the voltage control signal VCS corresponding to the regulated voltage level to the power supply 180 (S140).

The power supply 180, in response to the voltage control signal VCS, supplies the power voltage ELVDD or ELVSS to the pixel unit 140 via the power lines (S150). The corrector 190 senses a current flowing through the power lines (S160) and compares the sensed current with the estimated current corresponding to the power voltage ELVDD or ELVSS supplied to the power line (S170).

When the sensed current is not equal to the estimated current corresponding to the voltage level, the corrector 190 determines whether temperature of the organic light emitting display device 100 or the input image is changed (S180).

According to the determination, when the temperature of the organic light emitting display device 100 or the input image is not changed, the corrector 190 corrects the voltage level corresponding to the maximum luminance level MLL stored in the lookup table 170 based on the difference between the sensed current and the estimated current corresponding to the power voltage ELVDD or ELVSS supplied to the power lines (S190).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:
a pixel unit including pixels arranged at every intersection between data lines and scan lines;
a data driving unit supplying data signals to the data lines;
a scan driving unit supplying scan signals to the scan lines sequentially;
an image analyzer analyzing an input image and outputting a maximum luminance level of the input image according to the analyzed result;
a power voltage controller reading a voltage level corresponding to the maximum luminance level from a lookup table and outputting a power voltage control signal corresponding to the read voltage level;
a power supply supplying a power voltage corresponding to the voltage level to the pixel unit via power lines in response to the power voltage control signal; and
a corrector correcting the voltage level corresponding to the maximum luminance level stored in the lookup table based on a difference between a current flowing through the power lines and a current estimated in corresponding to the voltage level.

2. The organic light emitting display device as claimed in claim 1, wherein the image analyzer comprises:
a luminance histogram generator generating a luminance histogram for the input image; and
a maximum luminance level extractor extracting the maximum luminance level from the luminance histogram.

3. The organic light emitting display device as claimed in claim 2, wherein the image analyzer further comprise a power voltage variation estimator estimating a power voltage variation of the power voltage based on the luminance histogram and outputting the estimated power voltage variation to the power voltage controller.

4. The organic light emitting display device as claimed in claim 3, wherein the power voltage controller regulates and outputs the power voltage control signal in response to the estimated power voltage variation.

5. The organic light emitting display device as claimed in claim 1, wherein the corrector does not work when temperature of the organic light emitting display device and the input image are changed.

6. The organic light emitting display device as claimed in claim 1, wherein the power voltage is a driving power voltage or a base power voltage.

7. A method of driving an organic light emitting display device, the method comprising:
generating a luminance histogram for an input image;
extracting a maximum luminance level from the luminance histogram;
reading a voltage level corresponding to the maximum luminance level from a lookup table;
supplying a power voltage corresponding to the read voltage level to a pixel unit through power lines; and
correcting the voltage level corresponding to the maximum luminance level stored in the lookup table according to a difference between a current flowing through the power lines and an estimated current corresponding to the voltage level.

8. The method of driving an organic light emitting display device as claimed in claim 7, further comprising estimating a power voltage variation of the power voltage based on the luminance histogram.

9. The method of driving an organic light emitting display device as claimed in claim 8, wherein, in the supply of the power voltage corresponding to the read voltage level to the pixel unit though the power lines, the voltage level is regulated in response to the power voltage variation and the power voltage corresponding to the regulated voltage level is supplied to the pixel unit.

10. The method of driving an organic light emitting display device as claimed in claim 7, wherein correcting the voltage level comprises:
   determining whether temperature of the organic light emitting display device and the input image are changed; and
   correcting the voltage level corresponding to the maximum luminance level stored in the lookup table based on the difference between the current flowing through the power lines and the estimated current corresponding to the voltage level when the temperature and the input image are not changed as the determined result.

11. The method of driving an organic light emitting display device as claimed in claim 7, wherein the correction of the voltage level further comprises:
   sensing the current flowing through the power lines;
   comparing the estimated current corresponding to the voltage level with the sensed current; and
   correcting the voltage level corresponding to the maximum luminance level stored in the lookup table when the estimated current corresponding to the voltage level is different from the sensed current according to the compared result.

12. The method of driving an organic light emitting display device as claimed in claim 7, wherein the power voltage is a driving power voltage or a base power voltage.

* * * * *